L. O. SCHOPP.
VACUUM CAN SEALING MACHINE.
APPLICATION FILED JULY 15, 1920.
1,399,805. Patented Dec. 13, 1921.
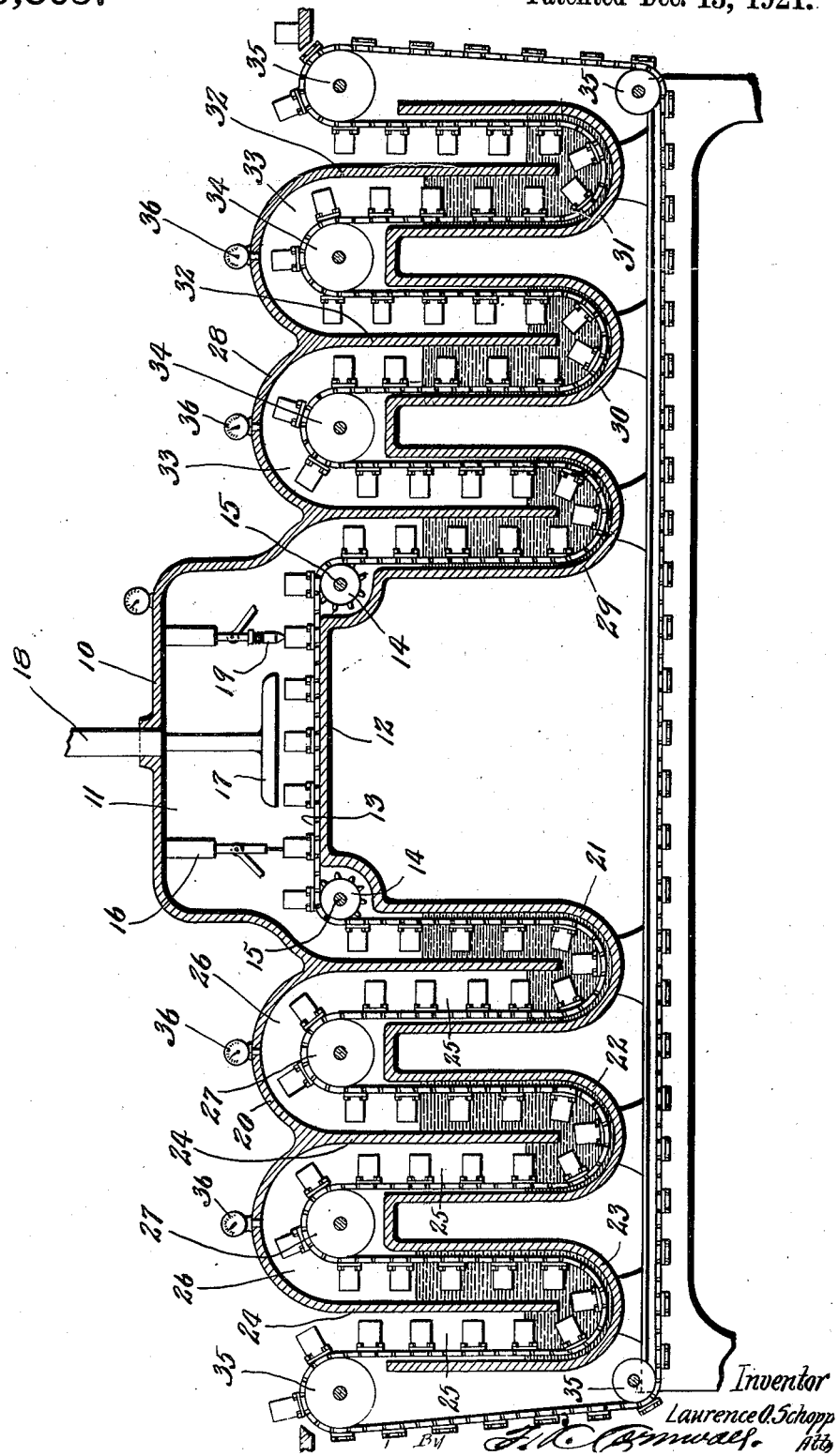
Inventor
Laurence O. Schopp

UNITED STATES PATENT OFFICE.

LAURENCE OLIVER SCHOPP, OF ST. LOUIS, MISSOURI.

VACUUM CAN-SEALING MACHINE.

1,399,805.    Specification of Letters Patent.    Patented Dec. 13, 1921.

Application filed July 15, 1920. Serial No. 396,584.

*To all whom it may concern:*

Be it known that I, LAURENCE O. SCHOPP, a citizen of the United States, residing at St. Louis, Missouri, have invented a certain new and useful Improvement in Vacuum Can-Sealing Machines, of which the following is a full, clear, and exact description, such as will enable others skilled in the art to which it appertains to make and use the same, reference being had to accompanying drawing, forming part of this specification.

My invention relates to a vacuum can sealing machine of the type disclosed in Patent No. 1,371,578, issued to me March 15, 1921, and upon which my present invention is an improvement, the principal object of my present invention being to provide relatively simple, efficient and compact means preferably in the form of auxiliary vacuum chambers that are separated by liquid sealed traps, for maintaining within the sealing chamber of the apparatus a relatively high degree of vacuum or that degree necessary to the successful operation of the apparatus.

In my copending application above referred to I have shown the sealing chamber provided on each side with a single liquid sealed trap through which and the sealing chamber, are carried the cans that are to be punctured and sealed in vacuum.

It has developed that under certain conditions and in the handling of certain kinds of canned goods, the desired degree of vacuum cannot be produced in the vacuum sealing chamber where a single liquid sealed trap is used on each side of said chamber unless the single traps are made in lengths that would preclude their practical use. To overcome this objection, I propose to arrange on each side of the vacuum sealing chamber, a plurality of auxiliary vacuum chambers, separated by liquid sealed traps, through which passes the conveyer for the cans or containers that are sealed in vacuum, and by such arrangement I am able to produce within the can puncturing and sealing chamber, the desired high degree of vacuum, the construction of the entire apparatus being very compact and capable of being readily installed with the other parts of the complete machine.

With the foregoing and other objects in view, my invention consists in certain novel features of construction and arrangement of parts, hereinafter more fully described and claimed, and illustrated in the accompanying drawing, which is a vertical section taken lengthwise through the center of a vacuum can sealing machine of my improved construction.

Referring by numerals to the accompanying drawing, which illustrates a practical embodiment of my invention, 10 designates a suitable housing the space 11 within which constitutes the vacuum chamber in which the cans are punctured and sealed after the air has been exhausted, and said housing is provided with a substantially flat bottom plate 12 over which passes the endless conveyer 13 that serves as a carrier for the cans. This conveyer may be of any desired type, and it is arranged to travel over suitable rolling supports, such as sprocket wheels or drums 14, and the latter being carried by transversely disposed shafts 15 that are journaled in suitable bearings adjacent to the ends of bottom plate 12.

As the cans arranged on the endless conveyer pass from one wheel or drum 14 to the other and over the bottom plate 12 of the housing, they are first engaged by a suitable can puncturing device 16, preferably an awl or pointed instrument that is reciprocated vertically in any suitable manner; thence said cans pass directly beneath the nozzle 17 of an air exhaust pipe 18 that leads to a vacuum pump (not shown) and immediately thereafter the cans pass beneath a reciprocating soldering tool 19.

Arranged on the front side of housing 10 or that side which is adjacent to the can puncturing device 16 is a housing 20 that is provided with a plurality of depending legs, and the latter being preferably arranged below the housing 10. In the present instance I have shown the housing 20 provided with three depending legs and have designated the same by the numerals 21, 22, and 23. Extending from the top of the housing 20 downwardly into these legs are vertically disposed transverse partitions 24, and by virtue of such construction a substantially U-shaped chamber 25 is formed in each leg and which chamber when filled or partially filled with liquid provides a liquid sealed trap in each leg. Thus the chambers 26 between the partitions 24 above the legs are entirely separate from each other and from the sealing chamber 11 within housing 10. The endless carrier 13 travels vertically through the legs of the U-shaped chambers 25, and within the chambers 26 above the U-shaped traps said conveyer passes over suitably journaled drums or sprocket wheels 27.

Located on the opposite side of the housing 10 is a housing 28 having a corresponding series of depending legs 29, 30, and 31, and extending downwardly into each leg is a vertically disposed transversely arranged partition 32, thereby forming within said legs substantially U-shaped chambers, which, when filled with liquid, provide liquid sealed traps that are separate from each other and from the vacuum sealing chamber 11. The endless conveyer passes vertically through the chambers within these legs 29, 30 and 31.

To the sides of the partitions therein and in the chambers 33 between the upper portions of said partitions, said conveyer passes over suitably located drums or sprocket wheels 34. At the outer ends of the housings 20 and 28, the endless conveyer passes around suitably located drums or pulleys 35, one or more of which may be power-driven so as to actuate the conveyer.

Seated in the upper portions of the housings 20 and 28 and communicating with the chambers 26 and 33 are suitable vacuum gages 36 that are automatic in operation and which at all times indicate the degrees of vacuum within said chambers. Likewise the vacuum sealing chamber 11 may be provided with a suitable vacuum indicating gage.

Each chamber 26 and 33 is connected to an exhaust pump and by providing a vacuum in each of the inner chambers 26 and 33 of higher degree than the vacuum in the outer chambers, the liquid seals in legs 22 and 30 will assume positions shown. By providing a still greater vacuum in chamber 11, the liquid seals in legs 21 and 29 will assume the positions shown. To provide a water seal with a single sealing chamber for the same degree of vacuum would require a structure from twenty to thirty feet high which would be undesirable if not altogether impracticable, especially in some plants where the height of the rooms is limited.

While I have shown the housings to the sides of the vacuum sealing chamber as being provided with three depending legs in which liquid seals are formed, it will be understood that the number of legs may be diminished or increased according to the requirements of the work that is being performed.

The entire apparatus is relatively simple, is capable of being easily and cheaply produced, and provides relatively simple and compact means for maintaining a comparatively high degree of vacuum within the can sealing chamber.

It will be readily understood that minor changes in the size, form and construction of the various parts of my improved vacuum can sealing machine can be made and substituted for those herein shown and described, without departing from the spirit of my invention, the scope of which is set forth in the appended claims.

I claim:

1. In combination with a vacuum sealing chamber, a plurality of successive connected U-shaped inlet passageways, and a series of successive connected U-shaped outlet passageways, and which U-shaped inlet and outlet passageways are partially filled with liquid, and means for conveying objects through said passageways and said chamber.

2. In combination with a vacuum sealing chamber having inlet and outlet passageways, each of which is provided with a plurality of vacuum chambers on its side of said sealing chamber, and means for conveying objects through successive vacuum chambers to one side of said sealing chamber into said sealing chamber and from same through successive vacuum chambers on the other side of said sealing chamber.

3. In a sealing machine, a vacuum sealing chamber, a plurality of successive interconnected vacuum chambers on each side of said chamber, and mechanism for conveying containers through all of said chambers.

4. In a sealing machine, a vacuum sealing chamber, a plurality of successive vacuum chambers on each side of said chamber, and mechanism for conveying containers progressively through the vacuum chambers on one side of said sealing chamber, through said sealing chamber, and then through the vacuum chambers on the other side of said sealing chamber.

5. In a sealing machine, a vacuum sealing chamber, a plurality of successive vacuum chambers on each side of said chamber, and mechanism for conveying containers progressively through the vacuum chambers on one side of said sealing chamber, through said sealing chamber, and then through the vacuum chambers on the other side of said sealing chamber, the degree of vacuum in said vacuum chambers increasing in successive vacuum chambers toward said sealing chamber and decreasing in succesive vacuum chambers away from said sealing chamber.

6. In a sealing machine, a vacuum sealing chamber, a plurality of successive vacuum chambers on each side of said chamber, and mechanism for conveying containers progressively through the vacuum chambers on one side of said sealing chamber, through said sealing chamber, and then through the vacuum chambers on the other side of said sealing chamber, the degree of vacuum in each chamber decreasing from said sealing chamber through successive vacuum chambers on each side of said sealing chamber.

7. In a sealing machine, a vacuum sealing chamber, a plurality of successive vacuum chambers on each side of said chamber, and mechanism for conveying containers progressively through the vacuum chambers on one side of said sealing chamber, through said sealing chamber, and then through the vacuum chambers on the other side of said sealing chamber, the degree of vacuum in said vacuum chambers increasing in successive vacuum chambers toward said sealing chamber and decreasing in successive vacuum chambers away from said sealing chamber.

8. In a can sealing machine, a plurality of vacuum chambers, and a vacuum sealing chamber, communicating and arranged in succession, said chambers being provided with progressively increasing degrees of vacuum therein.

9. In a can sealing machine, a plurality of vacuum chambers and a vacuum sealing chamber communicating and arranged in succession, said chambers being provided with progressively increasing degrees of vacuum therein, and a liquid seal between each of said chambers and the succeeding one.

10. In a can sealing machine, a vacuum sealing chamber, and a plurality of vacuum chambers communicating and arranged in succession, all of said chambers being provided with progressively decreasing degrees of vacuum therein.

11. In a can sealing machine, a vacuum sealing chamber, a plurality of vacuum chambers communicating and arranged in succession, all of said chambers being provided with progressively decreasing degrees of vacuum therein, and a liquid seal between each of said vacuum chambers and the succeeding one.

12. In a can sealing machine, a plurality of vacuum chambers communicating and arranged in succession, a vacuum sealing chamber, and another plurality of vacuum chambers arranged in succession, the degree of vacuum in said first-mentioned vacuum chambers progressively increasing toward said sealing chamber, and the degree of vacuum chambers progressively decreasing from said sealing chamber.

13. In a can sealing machine, a plurality of vacuum chambers communicating and arranged in succession, a vacuum sealing chamber, and another plurality of vacuum chambers arranged in succession, the degree of vacuum in said first-mentioned vacuum chambers progressively increasing toward said sealing chamber and the degree of vacuum in said latter mentioned vacuum chambers progressively decreasing from said sealing chamber, and a liquid seal between each of said chambers and the succeeding chamber.

In testimony whereof, I hereunto affix my signature this 12th day of July, 1920.

LAURENCE OLIVER SCHOPP.